United States Patent [19]

Sutoh et al.

[11] 4,356,705
[45] Nov. 2, 1982

[54] VEHICLE TEMPERATURE CONTROL APPARATUS

[75] Inventors: Shinji Sutoh, Konan; Takeshi Harada; Shinichi Kaneko, both of Higashi Matsuyama, all of Japan

[73] Assignee: Diesel Kiki Company, Ltd., Tokyo, Japan

[21] Appl. No.: 178,647

[22] Filed: Aug. 15, 1980

[30] Foreign Application Priority Data

Aug. 20, 1979 [JP] Japan ................... 54-105676

[51] Int. Cl.$^3$ .................. F25B 1/00; B60H 3/04; A23G 9/00; G05D 23/00
[52] U.S. Cl. ..................... 62/229; 62/209; 62/243; 62/323.4; 236/91 F
[58] Field of Search ............... 236/78 B, 9 R, 91 F, 236/91 R; 62/229, 203, 208, 209, 244, 243, 323.4

[56] References Cited

U.S. PATENT DOCUMENTS

| 2,474,441 | 6/1949 | Sparrow | 236/9 |
| 4,089,462 | 5/1978 | Bradford | 236/91 R |
| 4,132,086 | 1/1979 | Kountz | 62/229 |

Primary Examiner—Albert J. Makay
Assistant Examiner—Harry Tanner
Attorney, Agent, or Firm—David G. Alexander

[57] ABSTRACT

The outlet temperature of a cooler (31) is controlled within predetermined limits in accordance with the difference between a desired set temperature in an enclosure (13) and the actual temperature therein in such a manner as to minimize the time the cooler (31) is energized. Minor temperature variations in the enclosure occuring while the cooler (31) is off are compensated for by positioning an air mix door (37).

9 Claims, 6 Drawing Figures

VEHICLE TEMPERATURE CONTROL APPARATUS

BACKGROUND OF THE INVENTION

The present invention relates to an apparatus for controlling the temperature in an enclosure such as a passenger compartment of a motor vehicle.

Such a system typically comprises a heater and a cooler disposed in an air duct which opens into a vehicle passenger compartment. The heater and cooler are automatically controlled to maintain the temperature in the compartment at a desired set or command value. An air mix door or damper is provided to control the proportion of air flow through the heater and cooler.

Under low cooling load conditions, a compressor or an evaporator of the cooler are maintained on or the compressor is operated in an ON-OFF mode by a defroster switch having a constant changeover temperature level to maintain the temperature of air passing through the evaporator at a constant level. The air mix door mixes heated air from the heater with cooled air from the cooler to provide the desired compartment temperature.

It is not efficient to mix heated air with cooled air due to the irrational waste of power caused by the heater and cooler working against each other. The conventional prior art arrangement further wastes power since the compressor is operated more than necessary. The power wasted by the temperature control apparatus is produced by the engine, resulting in reduced vehicle performance and increased consumption of expensive fuel.

SUMMARY OF THE INVENTION

A temperature control apparatus for controlling a temperature in an enclosure embodying the present invention includes set means for setting a command enclosure temperature for the enclosure, enclosure temperature sensor means for sensing an actual enclosure temperature in the enclosure, temperature control means for discharging temperature controlled air into the enclosure and outlet temperature sensor means for sensing an outlet temperature of the temperature control means, and is characterized by comprising operation control means for turning the temperature control means on and off, the operation control means being constructed to compute a control on temperature and a control off temperature as predetermined functions of the command enclosure temperature and the actual enclosure temperature, turn the temperature control means on when the outlet temperature is higher than the control on temperature and turn the temperature control means off when the outlet temperature is lower than the control off temperature.

In accordance with the present invention, the outlet temperature of a cooler is controlled within predetermined limits in accordance with the difference between a desired set temperature in an enclosure and the actual temperature therein in such a manner as to minimize the time the cooler is energized. Minor temperature variations in the enclosure occuring while the cooler is off are compensated for by positioning an air mix door.

It is an object of the present invention to provide an improved vehicle temperature control apparatus which operates in a more efficient manner than comparable apparatus known heretofore.

It is another object of the present invention to provide a vehicle temperature control apparatus which eliminates an operation in which a heater and a cooler work against each other.

It is another object of the present invention to provide an improved vehicle temperature control apparatus which reduces the time which a compressor is maintained in operation.

It is another object of the present invention to provide a generally improved vehicle temperature control apparatus.

Other objects, together with the foregoing, are attained in the embodiments described in the following description and illustrated in the accompanying drawing.

DESCRIPTION OF THE PREFERRED EMBODIMENTS

While the vehicle temperature control apparatus of the present invention is susceptible of numerous physical embodiments, depending upon the environment and requirements of use, substantial numbers of the herein shown and described embodiments have been made, tested and used, and all have performed in an eminently satisfactory manner.

Figure 1:
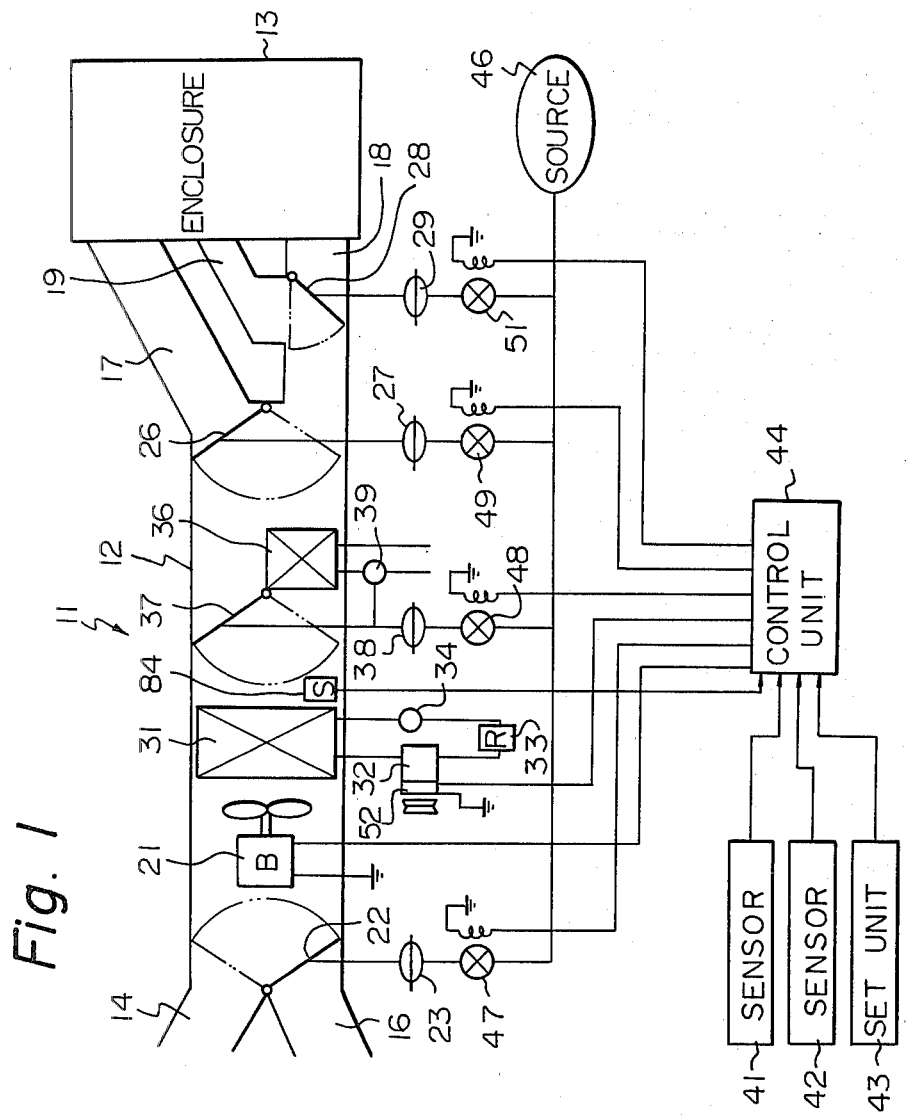
FIG. 1 is a schematic diagram of a vehicle temperature control apparatus embodying the present invention.

Referring now to FIG. 1 of the drawing, a vehicle temperature control apparatus embodying the present invention is generally designated by the reference numeral 11 and comprises an air flow duct 12 which leads into an enclosure 13 such as a passenger compartment of an automotive vehicle. The duct 12 has an outside air inlet 14 and a recirculated air inlet 16 which communicates with the enclosure 13, although the connection is not illustrated. The duct 12 also has an upper outlet 17, a lower outlet 18 and a defroster outlet 19 which open into the enclosure 13. Air is forced from the inlets 14 and 16 to the outlets 17, 18 and 19 by a blower 21. Air flow through the inlets 14 and 16 is controlled by a door or damper 22 by means of an actuator 23. Air flow through the outlets 17 and 18 is controlled by a door 26 by means of an actuator 27. Air flow through the outlets 18 and 19 is controlled by a door 28 by means of an actuator 29.

An evaporator or cooler 31 is disposed in the duct 12 for cooling air passing therethrough. The evaporator 31 forms a cooling circuit in combination with a compressor 32, a radiator 33 and an expansion valve 34. A heater core 36 is disposed in the duct 12 downstream of the evaporator 31. Hot water from the vehicle engine cooling system is passed through the heater core 36 to heat air passing through the duct 12. An air mix door 37 is movable by means of an actuator 38 to control the proportion of air passing through and around the heater core 36 and thereby the temperature of air discharged from the duct 12 into the enclosure 13. The actuator 38 also controls a valve 39 which in turn controls communication between the heater core 36 and the vehicle cooling system.

A sensor 41 is provided to sense the outside air temperature. A sensor 42 senses the air temperature in the enclosure 13. A set unit comprising a dial, variable and resistor the like is illustrated in block form and designated as 43. The vehicle operator sets the desired or command enclosure temperature into the apparatus 11 by means of the set unit 43. For example, if the operator wishes the temperature in the enclosure 13 to be 25° C., he will turn a dial (not shown) in the set unit 43 until it indicates 25° C.

The outputs of the sensors 41 and 42 and the set unit 43 are connected to inputs of a control unit 44 which may comprise a microcomputer or discrete components. The actuators 23, 34, 27 and 29 are powered by vacuum or pressure from a source 46. In a predetermined manner, the control unit 44 connects or disconnects the source 46 and actuators 23, 34, 27 and 29 by means of electrical solenoid valves 47, 48, 49 and 51 to automatically maintain the temperature in the enclosure 13 at the set or command value.

In accordance with an important feature of the present invention, the control unit 44 is constructed to turn the compressor 32 on or off by means of an electrically controlled clutch 52. The manner in which this operation is automatically performed will be described with reference to FIGS. 2 to 6.

Figure 2:
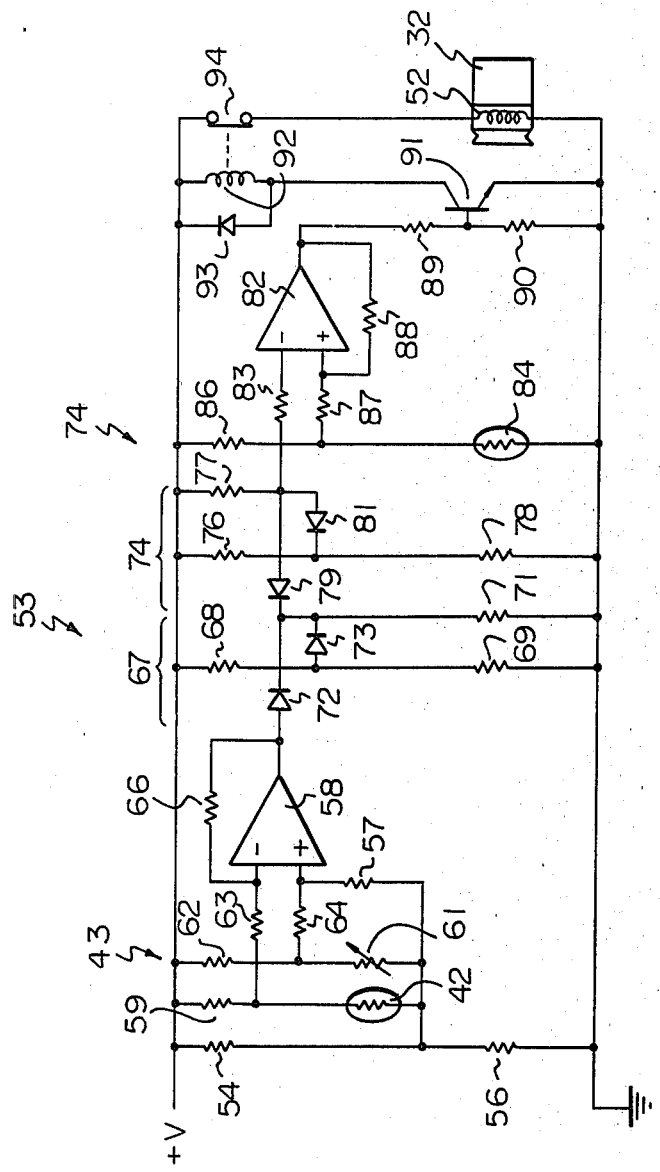
FIG. 2 is an electrical schematic diagram of a compressor control circuit of the present apparatus.
Figure 3:
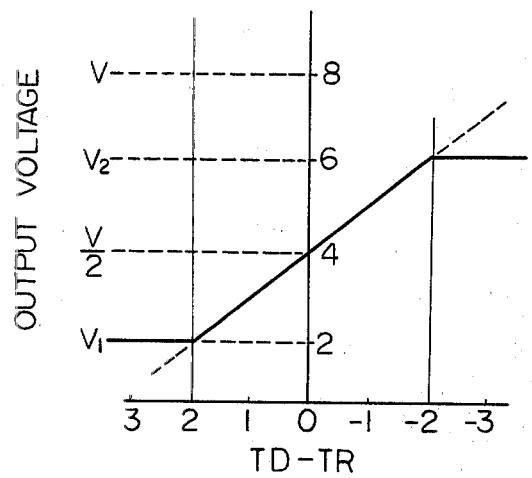
FIGS. 3 to 6 are graphs illustrating the operation of the present invention.

A portion of the control unit 44 which controls the clutch 52 is designated as 53 in FIG. 2 and comprises a voltage divider consisting of resistors 54 and 56 connected in seres between a positive source +V and ground. The junction of the resistors 54 and 56 is connected to the non-inverting input of an operational amplifier 58 through a input resistor 57. The sensor 42 is constituted by a thermistor connected in series with a resistor 59 across the resistor 54. The set unit 43 comprises a variable resistor 61 connected in series with a resistor 62 across the resistor 54. The junction of the thermistor 42 and resistor 59 is connected through an input resistor 63 to the inverting input of the operational amplifier 58 whereas the junction of the resistors 61 and 62 is connected through a resistor 64 to the non-inverting input of the operational amplifier 58. The amplifier 58 is connected to function in the differential mode with negative feedback being provided by a resistor 66.

The output of the amplifier 58 is connected through a first clamp circuit 67 consisting of resistors 68, 69 and 71 and diodes 72 and 73 and a second clamp circuit 74 consisting of resistors 76, 77 and 78 and diodes 79 and 81 to the inverting input of an operational amplifier 82 by means of an input resistor 83. Another sensor in the form of a thermistor 84 is disposed downstream of the evaporator 31 to sense the outlet temperature thereof and is connected in series with a resistor 86 between +V and ground. The junction of the thermistor 84 and resistor 86 is connected through an input resistor 87 to the non-inverting input of the amplifier 82. The amplifier 82 is connected to function as a voltage comparator with hysterisis provided by a feedback resistor 88.

The output of the amplifier 82 is connected through resistors 89 and 90 to ground. The junction of the resistors 89 and 90 is connected to the base of an NPN transistor 91, the emitter of which is connected to ground. The collector of the transistor 91 is connected to +V through a relay coil 92. A diode 93 is connected in parallel with the coil 92. Contacts 94 connected in series with the clutch 52 between +V and ground are closed when the coil 92 is energized, thereby turning on the compressor 32.

Figure 4:
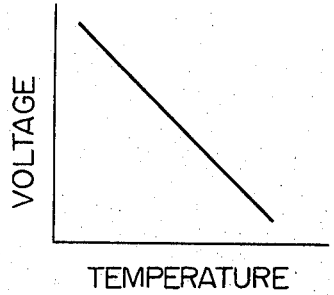

The operating characteristic of the thermistors 42 and 84 is shown in FIG. 4. The electrical resistances and thereby the voltages across the thermistors 42 and 84 which are applied to the amplifiers 58 and 82 respectively from the thermistors 42 and 84 decrease as the temperatures sensed by the thermistors 42 and 84 increase.

It will be assumed that the command enclosure temperature set in the unit 43 is designated as TD whereas the actual enclosure temperature sensed by the sensor 42 is designated as TR. The output of the amplifier 58 is isllustrated in FIG. 3. Increasing the resistance of the resistor 61 increases the voltage applied to the non-inverting input of the amplifier 58 and thereby the set or command temperature TD. As the actual temperature TR in the enclosure 13 increases, the voltage at the inverting input of the amplifier 58 decreases. The output of the amplifier 58 is proportional to the difference between the temperatures TD and TR, or TD-TR. Where the temperatures TD and TR are equal, the output of the amplifier 58 is V/2 or 4 volts. Where the actual temperature TR exceeds the command temperature TD by 2° C., the output of the amplifier 58 is 6 volts, etc.

The function of the clamp circuit 67 is to prevent the discharge temperature of the evaporator 31 from increasing above a predetermined level at which the response time of the apparatus 11 becomes too long to ensure the comfort of the occupants. This level corresponds to V1 (2 volts). As will be understood from further description, the voltage at the output of the amplifier 58 (between limits V1 and V2) is inversely proportional to a desired outlet temperature of the evaporator 31.

As long as the voltage at the output of the amplifier 58 is above V1, the diode 72 will be forward biased and the diode 73 will be reverse biased so that the output of the amplifier 58 is applied to the clamp circuit 74. However, if the output voltage of the amplifier 58 drops below V1, the diode 72 will be reverse biased and the diode 73 will be forward biased, applying the voltage at the junction of the resistors 68 and 69 (V1) to the clamp circuit 74.

The clamp circuit 74 functions to prevent the outlet temperature of the evaporator 31 from falling below a predetermined value at which the evaporator 31 would freeze. As long as the voltage at the output of the amplifier 58 is below a limit value V2, the diode 79 will be forward biased and the diode 81 will be reverse biased and the output of the clamp circuit 67 will be applied through the clamp circuit 74 to the amplifier 82. If, however, the output voltage of the amplifier 58 rises above V2, the diode 79 will become reverse biased and the diode 81 will become forward biased to apply the voltage at the junction of the resistors 76 and 78 (V2) to the input of the amplifier 82.

Whereas the voltage at the inverting input of the amplifier 82 increases (within the limit values V1 and V2) as the temperature TR in the enclosure 13 increases, the voltage at the non-inverting input of the amplifier 82 decreases as the temperature at the outlet of the evaporator 31 increases. The voltage at the inverting input of the amplifier 82 constitutes a command temperature at the outlet of the evaporator 31 which increases as the temperature TR in the enclosure 13 decreases. When the output of the amplifier 82 is high, the transistor 91 is turned off and the compressor 32 is turned off. Conversely, when the output of the amplifier 82 is low, the transistor 91 is turned on and the compressor 32 is also turned on.

From the above it will be understood that the amplifier 82 provides, due to the hysterisis provision, a temperature dead range between an upper trip point which corresponds to a compressor off or lower control temperature and a lower trip point which corresponds to a compressor on or upper control temperature. It is, however, well within the scope of the present invention to eliminate the resistor 88 and thereby the hysterisis provision of the amplifier 82 so that there is only one changeover point rather than two.

Figure 5:
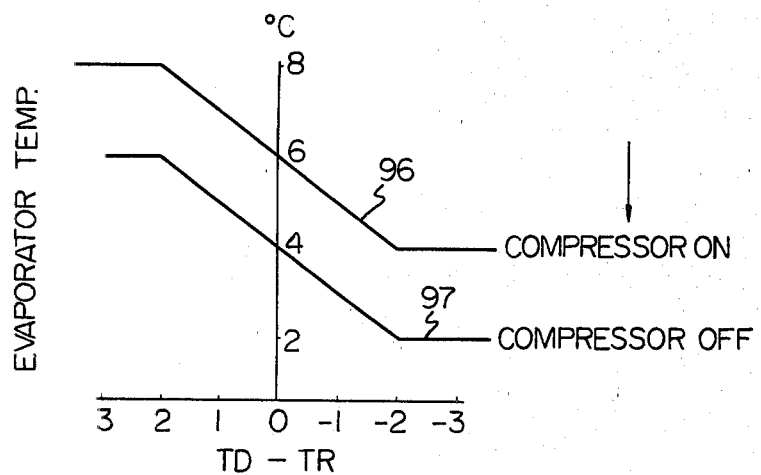

FIG. 5 illustrates the operation of the circuit 53. The upper control temperature is designated as 96 whereas the lower control temperature is designated as 97. There is a parallel channel of 2° C. between the temperatures 96 and 97. The evaporator 31 temperature is maintained between 6°-8° C. as long as the enclosure temperature TR is 2° C. or more below the set or command temperature TD. Conversely, the temperature of the evaporator 31 is maintained between 2°-4° C. as long as the actual temperature TR is 2° C. or more higher than the command temperature TD to increase the cooling efficiency. Within this range, the evaporator temperature is controlled to be inversely proportional to the actual temperature TR.

Figure 6:
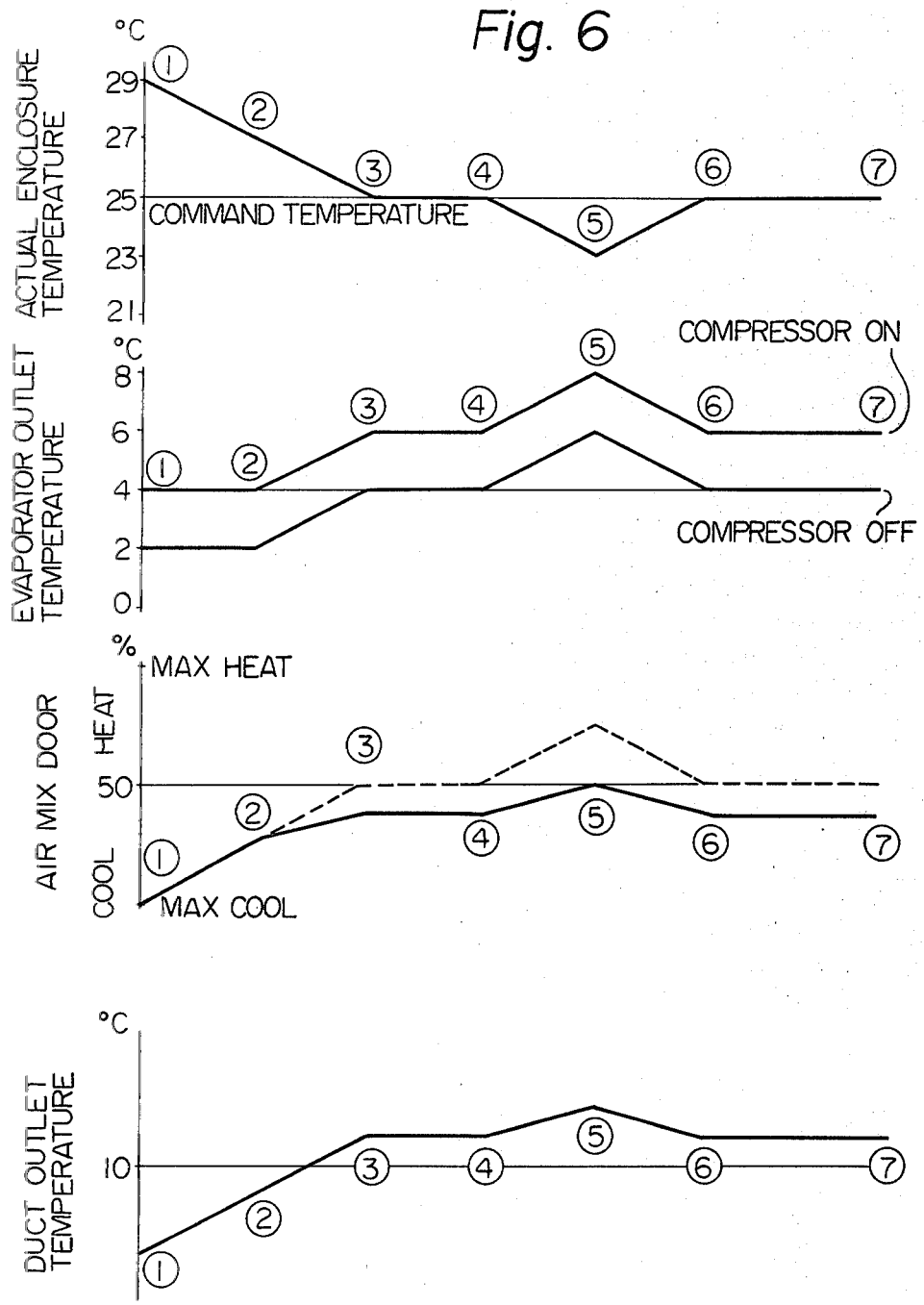

The advantage of the present invention will become clear from the graphs of FIG. 6 in which curves illustrate the relationship between the evaporator outlet temperature, the angular position of the air mix door 37, and the duct outlet temperature relative to the variation of the enclosure temperature TR. The illustrated relationship holds when the evaporator 31 is maintained on at an enclosure temperature TR higher than a desired set or command temperature TD (25° C.).

First, the enclosure temperature TR gradually drops between ① and ② and the air mix door 37 starts moving toward "HEAT" side. The evaporator outlet temperature then remains at the lower limit. Next, the enclosure temperature TR further drops between ② and ③, and the evaporator outlet temperature rises. At this time, however, since the air mix door 37 is moved toward "COOL" side by an angular distance proportional to the rise of the evaporator outlet temperature, the duct outlet temperature remains the same. The enclosure temperature TR is maintained stable at the desired command temperature TD (25° C.) between ③ and ④, and again drops between ④ and ⑤. The enclosure temperature TR rises between ⑤ and ⑥ and is again maintained stable at the desired command temperature TD (25° C.) between ⑥ and ⑦. It is thus noted that minor temperature variations may be compensated for by positioning the air mix door 37. The dotted line in the curve of FIG. 6 illustrates, for comparison, conventional control involving evaporator pressure regulation or control using a defroster switch having a constant changeover point.

In summary, it will be seen that the present invention overcomes the drawbacks of the prior art and provides a vehicle temperature control apparatus which minimizes the amount of time a compressor of a cooling system is energized and thereby the power consumption of the apparatus. Various modifications will become possible for those skilled in the art after receiving the teachings of the present disclosure without departing from the scope thereof.

What is claimed is:

1. A temperature control apparatus for controlling a temperature in an enclosure, comprising:
   air flow duct means communicating with the enclosure and having cooling means, heating means and air mix door means for controlling a proportion of air passing through the heating means;
   outlet temperature sensor means for sensing an outlet temperature of the cooling means;
   set means for setting a command enclosure temperature for the enclosure;
   enclosure temperature sensor means for sensing an actual enclosure temperature in the enclosure; and
   operation control means for turning the cooling means on and off, the operation control means being constructed to control the cooling means in such a manner that the outlet temperature of the cooling means is controllably varied within predetermined limits in accordance with a difference between the set command enclosure temperature and the actual enclosure temperature to thereby minimize the time the cooling means is energized;
   the operation control means being constructed to compute a control on temperature and a control off temperature as predetermined functions of the command enclosure temperature and the actual enclosure temperature, turn the cooling means on when the outlet temperature is higher than the control on temperature and turn the cooling means off when the outlet temperature is lower than the control off temperature;
   the operation control means comprising differential amplifier means having inputs connected to outputs of the set means and enclosure temperature sensor means respectively, upper and lower clamp means connected to an output of the differential amplifier means and comparator means provided with a hysterisis function and having inputs connected to outputs of the upper and lower clamp means and the outlet temperature sensor means respectively.

2. An apparatus as in claim 1, in which the control on and control off temperatures are equal.

3. An apparatus as in claim 1, in which the control on temperature is higher than the control off temperature.

4. An apparatus as in claim 1, in which the operation control means is constructed to compute the control on and control off temperatures as predetermined functions of a difference between the command enclosure temperature and the actual enclosure temperature.

5. An apparatus as in claim 1, in which the operation control means is constructed to increase the control on and control off temperatures as the actual enclosure temperature decreases.

6. An apparatus as in claim 1, in which the operation control means is constructed to increase the control on and control off temperatures up to predetermined respective upper limit values as the actual enclosure temperature decreases when the actual enclosure temperature is below the command enclosure temperature; and decrease the control on and control off temperatures down to predetermined respective lower limit values as the actual enclosure temperature increases when the actual enclosure temperature is above the command enclosure temperature.

7. An apparatus as in claim 1, in which minor temperature variations in the enclosure occuring while the cooling means is off are compensated for by positioning the air mix door means.

8. An apparatus as in claim 1, in which the outlet temperature sensor means is disposed downstream of the cooling means in the air flow duct means.

9. An apparatus as in claim 1, in which the cooling means comprises a compressor having an electromagnetic clutch, the operation control means further comprising an electromagnetic relay having a coil connected to an output of the comparator means and contacts connected in series with the electromagnetic clutch.

* * * * *